United States Patent Office 3,026,233
Patented Mar. 20, 1962

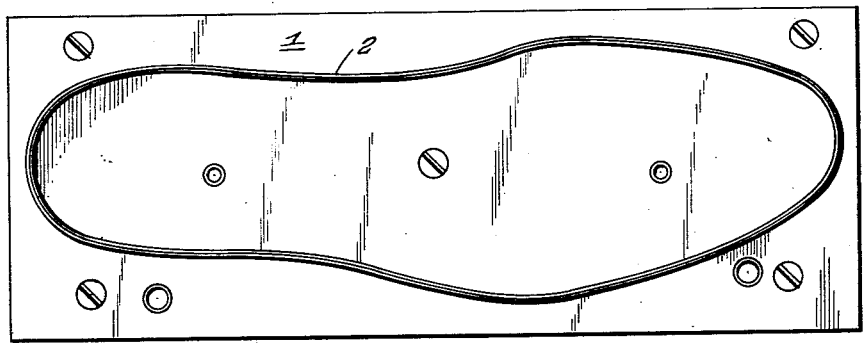
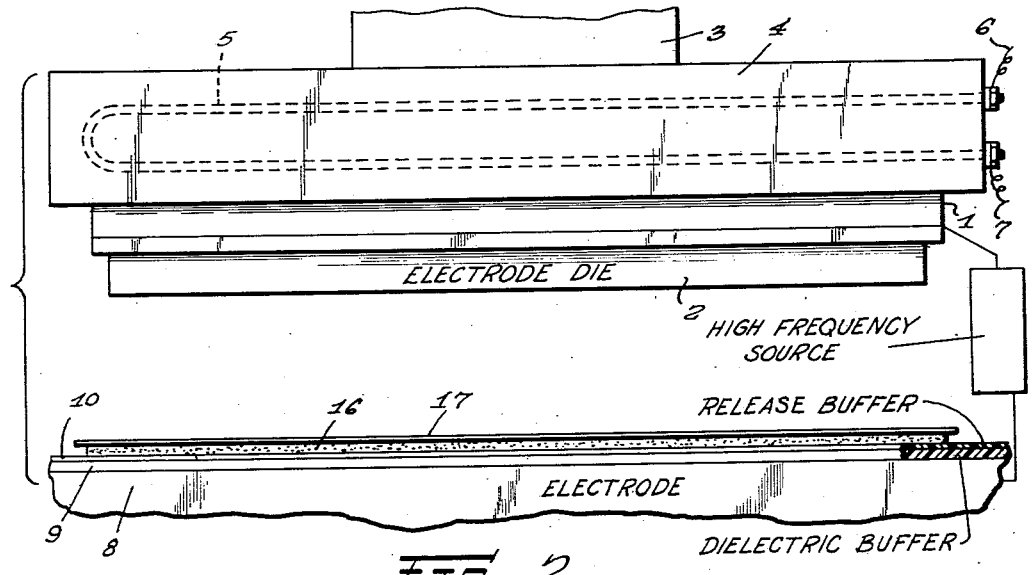
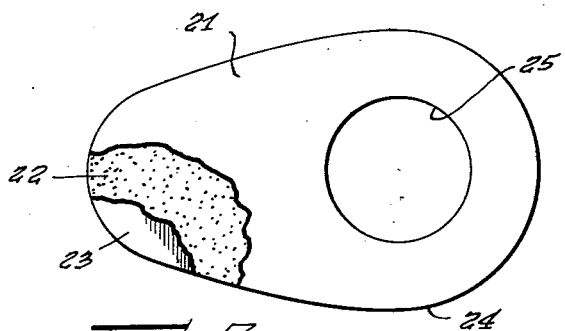
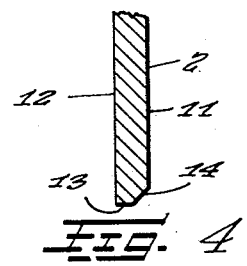
Inventors
William M. Scholl
Lawrence C. Pendergast Inventors
William M. Scholl
Lawrence C. Pendergast

3,026,233
ELECTRONIC HEAT SEALING POLYURETHANE FOAM
William M. Scholl, Chicago, Ill., and Lawrence C. Pendergast, Rutherford, N.J., assignors to The Scholl Mfg. Co., Inc., Chicago, Ill., a corporation of New York
Filed Jan. 7, 1959, Ser. No. 785,512
4 Claims. (Cl. 156—251)

This invention relates to improvements in a method of making heat sealed articles, and more particularly to a method of making an article comprising a layer of thermoplastic foam heat sealed to a layer of thermoplastic film, although the invention may have other uses and purposes as will be apparent to one skilled in the art.

It has become desirable to make many articles wherein a cushioning effect is desirable by heat sealing together a sheet of chemical foam of the flexible type to a suitable cover such as a chemical film; although in some instances further laminations of either foam or film may be utilized in the completed structure, depending upon the purpose for which it is intended. Among such articles are bath mats, seat and stool cushions, and various other such appliances, and such structures have been found particularly desirable for foot cushioning devices such as insoles, longitudinal and metatarsal arch supporting structures, callus, corn, and bunion alleviators, simple bandages, plasters, and the like. When articles are formed of materials of this character and utilized for foot cushioning appliances, for example, they possess many more advantages than articles heretofore made for similar purposes but of different material and with the laminations joined in a different way. For example, insoles have heretofore been made in many instances of a sheet of foam latex covered by a fabric to which the sheet of latex was either cemented or cured directly on the fabric. A chemical foam united to a chemical film by heat sealing at the bounding edges, however, has the advantages over the other structure of being much more durable, providing better ventilation, avoiding objectionable wrinkling while in use, being readily and easily launderable and drying in an extremely short time thereafter, providing better tensile strength, better shock absorbing powers, and also providing a thin hairline or knife edge heat sealing seam regardless of the number of laminations used.

Articles of this character may be made on known types of electronic heat sealing presses. In the commercial manufacture of articles wherein the heat seal seam joining the laminations completely defines the contour of the article, it is desirable if not essential, for economical reasons to acquire in a single operation what may be termed a heat and tear seam; i.e. a heat seal seam which, while joining the laminations together in a fine line circumscribing seam, also provides a tear line permitting ready and easy stripping of the waste material from the completed article without the need of any cutting means and leaving a smooth well defined edge on the article.

This desideratum has been heretofore accomplished by the heat sealing of a sheet of vinyl foam to a sheet of unsupported vinyl film. However, insofar as we are aware, this has never been accomplished with the use of a polyester foam of flexible character such as an isocyanate resin foam or polyurethane foam, at least insofar as anything capable of being used in commercial production is concerned, until the advent of the instant invention. And this, notwithstanding repeated previous efforts of applicants as well as repeated endeavors to ascertain information as to how to accomplish it from others. For purposes of convenience, this foam will be referred to hereinafter as polyurethane foam. It has long been desirable, particularly by applicants, to utilize polyurethane foam instead of vinyl foam because polyurethane foam has greater insulating properties, and is far more economical, economy being an essential in a highly competitive industry.

Also a desideratum of this invention is the provision of a new and novel method of heat sealing a thermoplastic foam to a thermoplastic sheet or film.

A further object of the instant invention resides in the provision of a new and novel method, highly suitable for commercial productive practice, of heat sealing a sheet of polyurethane foam to a thermoplastic film, such, for example, as an unsupported vinyl film.

A further object of the invention resides in the provision of a new and novel method of simultaneously heat and tear sealing a sheet of polyurethane foam to an unsupported thermoplastic film, such, for example, as a vinyl film.

While some of the more salient features, characteristics and advantages of the instant invention have been above pointed out, others will become apparent from the following disclosures, taken in conjunction with the accompanying drawings, in which:

FIG. 1 is a bottom plan view of a form of die utilizable in an electronic heat sealing press in the practice of the instant invention;

FIG. 2 is a fragmentary exploded elevational view illustrating the use of the die of FIG. 1 in accord with the instant invention;

FIG. 4 is a greatly enlarged fragmentary vertical sectional view through the die element itself;

FIG. 7 is a plan view of an article of different shape to illustrate the versatility of the instant invention.

As shown on the drawings:

Figure 3:
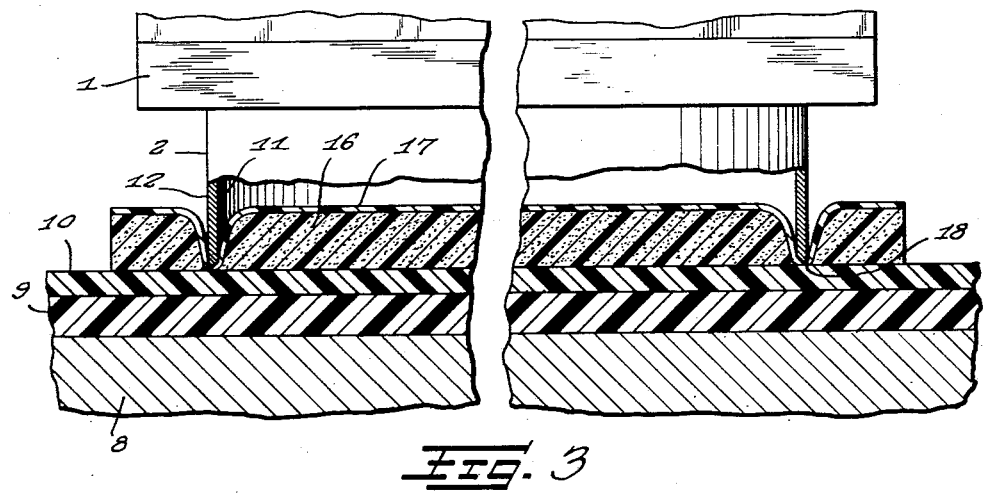
FIG. 3 is a fragmentary vertical sectional view, partly in elevation, illustrating the completion of the formation of an article utilizing the die of FIGS. 1 and 2.

The product of the instant invention is disclosed, described, and claimed in a divisional William M. Scholl application entitled "Foot Cushioning Devices for Use in Articles of Footwear," filed August 18, 1959, Serial No. 834,515, issued April 18, 1961, as United States Letters Patent No. 2,979,836.

While the structure resulting from the practice of the instant invention may comprise full or partial laminations exceeding two in number of either the foam or film and with those laminations each heat sealed to one or more of the other laminations, for the sake of simplicity the structure is disclosed and described herein in the form of a foot cushioning appliance having but a single foam and a single film lamination.

In the disclosure of FIGS. 1 to 6 inclusive, the method and resultant article are related to a foot cushioning appliance in the nature of a full insole for free disposition in an article of footwear such as a slipper or shoe.

In order to make this particular article, a die is utilized which comprises a fabricated metallic backing plate 1 of conductive material which carries a die element 2 preferably of brass or equivalently highly conductive material. The die element 2 is secured to the base plate 1 in any suitable manner. This die is utilized in a known form of electronic heat sealing press.

The press is diagrammatically illustrated particularly in FIG. 2, and includes a vertically reciprocable plunger 3 actuated by any suitable mechanism and which carries on its lower end a head 4 to which the die 1–2 may be removably attached in any suitable manner. In this instance, the head 4 is provided with an internal electrical heating element 5 which may be connected by wires 6 and 7 to any convenient outlet. The energization of the heating element in the head 4 is separate and apart from the energization of the electronic or high frequency arrangement associated with the press.

The press also includes a base plate or negative electrode 8 upon which the material to be heat sealed is disposed. While the instant invention has been successfully made by placing the lower lamination of the resultant product directly upon the naked metallic base plate 8, it may be preferable at times to utilize a buffer in order to enhance the life of the die 1–2. If such a buffer is deemed necessary, it may be in the form of a sheet 9 of phenolic material or other dielectric insulating material. Since the present invention comprises a sheet of polyurethane foam, and this foam is likely to stick to a phenolic surface, it is preferable to use a thinner sheet 10 on top of the main buffer sheet 9, and this thinner sheet may well be made of a plastic consisting of a tetrafluoroethylene polymer or a fluorcarbon resin, to which the polyurethane foam will not adhere before or after the heat sealing operation is performed.

Now with reference to FIGS. 3 and 4, particularly FIG. 4, it will be seen that the die element 2 is preferably in the form of an endless band of strip stock. Also preferably, this die element is so shaped as to provide a straight inside wall 11, a straight outside wall 12, a substantially flat and narrow working edge 13 of less width than the wall thickness, and a bevel 14 on the inside leading from the inner edge of the working edge 13 to the wall 11. This die shaping has been found satisfactory for use with the instant invention. By way of example, and not by way of limitation, it may be mentioned that a satisfactory thickness for the die element wall, for use with a foam sheet approximately $3/16''$ in thickness, may be approximately $0.05''$, and the edge 13 may satisfactorily be approximately $5/8$ of the wall thickness. The angle of the bevel 14 is not critical, and it may satisfactorily be in the neighborhood of $45°$.

Figure 5:
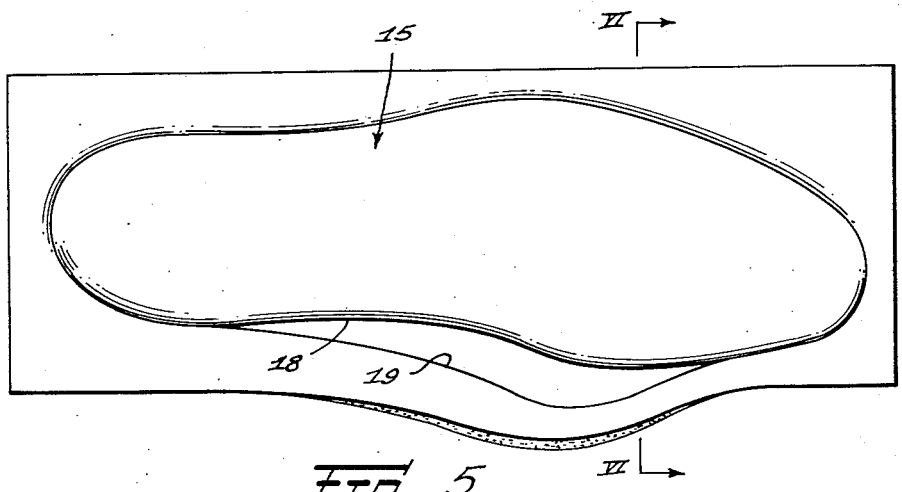
FIG. 5 is a fragmentary plan view of the finished article, illustrating separation of the waste material from the finished article.
Figure 6:
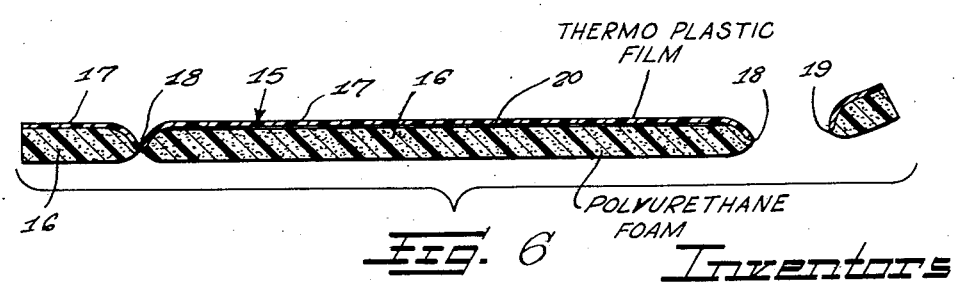
FIG. 6 is a transverse vertical sectional view, fragmentary in character, and taken substantially as indicated by the line VI—VI of FIG. 5.

In the making of an insole, generally indicated by numeral 15 in FIGS. 5 and 6, a sheet 16 of polyurethane foam is laid directly upon the naked press base 8 or upon the auxiliary buffer sheet 10 as may be desired. On top of this sheet of foam, a sheet 17 of thermoplastic film is disposed, and this sheet 17, by way of example and not by way of limitation, may satisfactorily be unsupported vinyl film.

Before or after placing the sheets 16 and 17 in position, the temperature of the die element 2 is raised by means of the heating element 5. This initial elevating of the temperature of the die element is a significant factor in the instant method, and the temperature of the die element may vary in accordance with the thickness of the foam sheet 16. Again, by way of example and not by way of limitation, it may be stated that a satisfactory temperature for the die element with a foam sheet of approximately $3/16''$ thickness is in the neighborhood of $250°$ F.

The plunger 3 is then lowered, forcing the die element 2 into contact with the superposed sheets 16 and 17 to the position seen in FIG. 3. Contemporaneously with the contact of the edge 13 of the die element with the upper sheet 17, the electronic arrangement of the press is energized at a low radio frequency. This results in the provision of a satisfactory heat seal seam 18.

Since the die element 2 is of a configuration to define the outline of the resultant article, the heat seal seam will be continuous around the bounding edge of the article or insole 15, in the illustrated instance. The produced insole 15, as illustrated, is for the left foot of a user and it will be understood that an allochiral die would be utilized to provide an insole for the right foot.

The die does not pass entirely through both the sheets 16 and 17, but fuses those sheets together at the seam 18, and this seam also functions as a tear seam permitting the waste material surrounding the finished article to be readily stripped from the finished article as indicated at 19 in FIGS. 5 and 6. It will be noted that after the waste material is stripped from the finished article, the heat seal seam at the bounding edge of the article is a fine line smooth and well defined seam, there being a definite curvature in the marginal portion of both sheets toward that fine line seam. It will also be noted that there is preferably no securement between the upper sheet and the lower sheet except at the heat seal seam, so that these sheets are otherwise unsecured to each other as indicated by the magnified space 20 in FIG. 6.

The exact reason why the above described method results in the desired heat and tear sealing of polyurethane foam to a thermoplastic film such as an unsupported vinyl film is not fully realized at the present time, but it is believed that the heat in the die element 2 resulting from the heating element 5 actually does some melting of the sheets 16 and 17 and the application of a low radio frequency current by means of the electronic arrangement in the press helps create adequate fusing of the melted portions of the sheet and insures a good seal particularly at the under side of the heat seal seam.

In FIG. 7 we have illustrated a foot supporting cushion of a different shape for the purpose of indicating that the instant invention may be varied through a considerable extent as to the size and shape of the product produced. In this instance, the foot supporting device is in the form of an apertured cushion comprising an upper thermoplastic film 21, an inner polyurethane foam sheet 22, and a lower thermoplastic film 23, all three laminations being heat sealed together around the bounding edge as indicated at 24, and also heat sealed around the aperture through the pad as indicated at 25. Both these heat seal seams are of the same character as above described, and may be made in the same or single operation. Other and various shapes and sizes of products may be produced in accord with the instant invention, as will be apparent to one skilled in the art.

From the foregoing, it is apparent that we have provided a successful method of heat sealing polyurethane foam to a thermoplastic film and of providing an extremely durable foot supporting cushion utilizing polyurethane foam. The method may be economically practiced, and the resultant product is economical both to manufacture and to use by virtue of its durability.

It will be understood that modifications and variations may be effected without departing from the scope of the novel concepts of the present invention.

We claim as our invention:

1. The method of heat and tear sealing polyurethane foam to a thermoplastic film with electronic heat sealing equipment, including the steps of placing a sheet of polyurethane foam on an electrode, placing a sheet of thermoplastic film over the foam sheet, preheating an electrode die, forcing the heated die on the superposed sheets, charging the die with a high frequency current, and tearing off waste material along the outer edge of the resultant heat seal seam.

2. The method of heat and tear sealing polyurethane foam to an unsupported vinyl film, including the steps of superposing a sheet of polyurethane foam and a sheet of vinyl film on an electrode, preheating an electrode die to a temperature in proportion to the thickness of the foam sheet, pressing the die on the superposed sheet, passing a high frequency current through the die, and tearing off the waste part of said sheets along the heat seal seam.

3. The method of heat and tear sealing polyurethane foam to a vinyl film, including the steps of superposing a sheet of polyurethane foam and a sheet of vinyl film on an electrode, preheating above 200° F. an electrode die shaped to define the entire outer edge of a desired article, pressing the heated die on the superposed sheets, passing a high frequency current through the die, and tearing the waste part of said sheets from the defined article along the heat seal seam established by the die.

4. The method of making a foot cushioning appliance, including the steps of superposing a thin thermoplastic film sheet and a thicker sheet of polyurethane foam over an electrode, preheating an electrode die, pressing the heated die on the superposed sheets, energizing the die with a high frequency current to form a fine line heat seal seam defining the bounding edge of the appliance, and stripping off the waste around the edge of said heat seal seam.

References Cited in the file of this patent

UNITED STATES PATENTS

| | | |
|---|---|---|
| 2,425,388 | Oestricher | Aug. 12, 1947 |
| 2,631,646 | Gannon | Mar. 17, 1953 |
| 2,706,165 | Korsgaard | Apr. 12, 1955 |
| 2,878,153 | Hacklander | Mar. 17, 1959 |
| 2,914,109 | Ming C. Hsu et al. | Nov. 24, 1959 |

FOREIGN PATENTS

| | | |
|---|---|---|
| 810,095 | Great Britain | Mar. 11, 1959 |
| 542,861 | Italy | Mar. 7, 1956 |

(Duplicate British Patent No. 810,095)

| | | |
|---|---|---|
| 213,775 | Australia | Mar. 12, 1956 |

OTHER REFERENCES

"Urethane Plastics—Polymers of Tomorrow," I. & E.C. 9/56, pp. 1383–1391 (only p. 1387 relied on).